US009751563B2

(12) United States Patent
Tomikuda et al.

(10) Patent No.: US 9,751,563 B2
(45) Date of Patent: Sep. 5, 2017

(54) SUBFRAME FOR VEHICLE

(71) Applicants: F-TECH INC., Kuki, Saitama (JP); HONDA MOTOR CO., LTD., Tokyo (JP)

(72) Inventors: Norio Tomikuda, Tochigi (JP); Yusuke Arai, Wako (JP); Tsutomu Ogawa, Wako (JP); Taiyo Gon, Wako (JP); Koji Tagome, Wako (JP)

(73) Assignees: F-TECH INC., Kuki (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/902,945

(22) PCT Filed: Jun. 10, 2014

(86) PCT No.: PCT/JP2014/065340
§ 371 (c)(1),
(2) Date: Feb. 10, 2016

(87) PCT Pub. No.: WO2015/005044
PCT Pub. Date: Jan. 15, 2015

(65) Prior Publication Data
US 2016/0152272 A1 Jun. 2, 2016

(30) Foreign Application Priority Data
Jul. 11, 2013 (JP) .................................. 2013-145398

(51) Int. Cl.
*B62D 21/11* (2006.01)
*B62D 21/02* (2006.01)

(52) U.S. Cl.
CPC .............. *B62D 21/11* (2013.01); *B62D 21/02* (2013.01)

(58) Field of Classification Search
CPC ....................................................... B62D 21/11
(Continued)

(56) References Cited

U.S. PATENT DOCUMENTS

2004/0140659 A1* 7/2004 Kato ...................... B62D 21/11
280/785
2010/0102543 A1* 4/2010 Kang ..................... B62D 21/11
280/784

(Continued)

FOREIGN PATENT DOCUMENTS

DE 102010054086 A1 * 6/2012
DE 102012111032 A1 5/2013
(Continued)

OTHER PUBLICATIONS

International Search Report dated Jul. 15, 2014, issued in counterpart International Application No. PCT/JP2014/065340 (1 page).
(Continued)

*Primary Examiner* — Jason S Morrow
(74) *Attorney, Agent, or Firm* — Westerman, Hattori, Daniels & Adrian, LLP

(57) ABSTRACT

To realize weight saving of a vehicle subframe, while ensuring required strength and stiffness thereof with a simple configuration, there are provided a first hole portion in at least one of an upper member and a lower member in a first region, and a second hole portion in at least one of the upper member and the lower member in a second region.

9 Claims, 4 Drawing Sheets

(58) Field of Classification Search
USPC .......................................... 296/204; 280/788
See application file for complete search history.

(56) References Cited

U.S. PATENT DOCUMENTS

| | | | |
|---|---|---|---|
| 2010/0231005 A1* | 9/2010 | Yoshida | B62D 3/12 |
| | | | 296/203.02 |
| 2013/0241186 A1* | 9/2013 | Shibaya | B62D 21/11 |
| | | | 280/781 |
| 2016/0023680 A1* | 1/2016 | Minoda | B62D 21/11 |
| | | | 280/124.135 |
| 2016/0052564 A1* | 2/2016 | Graefe | B29C 43/16 |
| | | | 296/204 |
| 2016/0068189 A1* | 3/2016 | Imanishi | B22C 9/10 |
| | | | 296/204 |

FOREIGN PATENT DOCUMENTS

| | | |
|---|---|---|
| JP | 2000-6833 A | 1/2000 |
| JP | 2004-203274 A | 7/2004 |
| JP | 2009-96370 A | 5/2009 |
| JP | 2010-100275 A | 5/2010 |

OTHER PUBLICATIONS

European Search Report dated Jul. 6, 2017, issued in counterpart application No. 14822179.9 (8 pages).

* cited by examiner ered inside a hollow structure, in order to suppress vibrations in a vertical direction by increasing stiffness particularly with respect to a vertical force, among a front-rear force, a lateral force, and the vertical force applied to the front suspension member via an engine mount and a suspension arm, thereby sufficiently ensuring strength and stiffness thereof, while improving productivity.

SUBFRAME FOR VEHICLE

TECHNICAL FIELD

The present invention relates to a vehicle subframe, and more particularly relates to a vehicle subframe that supports a suspension arm or the like and is mounted on a body of a vehicle such as an automobile.

BACKGROUND ART

In recent years, various external-force application members such as suspension-related components such as a suspension arm and a stabilizer, steering-related components such as a steering gearbox, and mounting-related components of an engine transmission system are mounted on a vehicle subframe of an automobile or the like.

Therefore, it is required to further increase strength and stiffness of the subframe, while improving productivity thereof.

Under such circumstances, Patent Document 1 relates to a front suspension member and discloses a configuration in which a third panel is combined with respect to a first panel and a second panel instead of a bulk head mounted inside a hollow structure, in order to suppress vibrations in a vertical direction by increasing stiffness particularly with respect to a vertical force, among a front-rear force, a lateral force, and the vertical force applied to the front suspension member via an engine mount and a suspension arm, thereby sufficiently ensuring strength and stiffness thereof, while improving productivity.

PRIOR ART DOCUMENT

Patent Document

Patent Document 1: Japanese Patent Application Laid-open Publication No. 2000-6833

SUMMARY OF THE INVENTION

Problem to be Solved by the Invention

However, according to studies made by the present inventors, in Patent Document 1, although the bulk head mounted inside the hollow structure is omitted, the third panel needs to be combined with respect to the first panel and the second panel. Therefore, the configuration thereof becomes complicated, and there is room for improvement with regard to simplifying the configuration, while ensuring required productivity, strength, and the like.

Furthermore, according to studies made by the present inventors, an energy saving property has been strongly desired with respect to vehicles such as an automobile at the time of production and use thereof. From such a viewpoint, also in a vehicle subframe, a novel configuration that can achieve weight saving, while ensuring required productivity, strength, and the like has been strongly desired.

The present invention has been achieved in view of the above problems, and an object of the present invention is to provide a vehicle subframe that can achieve weight saving, while ensuring required productivity, strength, and the like, with a simple configuration.

Means for Solving the Problem

To achieve the above object, a first aspect of the present invention is to provide a vehicle subframe mounted on a vehicle body, including a body portion having an upper member and a lower member joined to the upper member below thereof, in which the upper member and the lower member are cooperatively to constitute a closed cross section, a plurality of support portions provided with respect to the body portion to support a plurality of suspension arms correspondingly, a first support portion, of the support portions, provided on a left side in a width direction and on a front side in a longitudinal direction of the vehicle body, a second support portion, of the support portions, provided on a right side in the width direction and on the front side in the longitudinal direction, a third support portion, of the support portions, provided on the left side in the width direction and on a rear side in the longitudinal direction, and a fourth support portion, of the support portions, provided on the right side in the width direction and on the rear side in the longitudinal direction. Here, a plurality of regions are defined in the body portion in a plan view, by a straight line connecting the first support portion and the fourth support portion and a straight line connecting the second support portion and the third support portion, the regions include a first region spreadly extending from an intersection point between the straight lines toward the left side in the width direction, a second region spreadly extending from the intersection point toward the right side in the width direction, a third region spreadly extending from the intersection point toward the front side in the longitudinal direction, and a fourth region spreadly extending from the intersection point toward the rear side in the longitudinal direction, and a first hole portion is provided in at least one of the upper member and the lower member in the first region, and a second hole portion is provided in at least one of the upper member and the lower member in the second region.

According to a second aspect of the present invention, in addition to the first aspect, the first hole portion and the second hole portion respectively include through holes provided in both the upper member and the lower member so as to pass completely therethrough.

According to a third aspect of the present invention, in addition to the second aspect, in the first hole portion and the second hole portion, respective edges thereof are joined to each other.

According to a fourth aspect of the present invention, in addition to the third aspect, the respective edges are joined to each other at flanges respectively provided in both the upper member and the lower member.

According to a fifth aspect of the present invention, in addition to any of the first to fourth aspects, the body portion includes a first framework portion extending between the first support portion and the third support portion, a second framework portion extending between the second support portion and the fourth support portion, a third framework portion extending between the first support portion and the second support portion, and a fourth framework portion extending between the third support portion and the fourth support portion, and the first framework portion has a concave shape depressed toward the right side in the width direction in the plan view, the second framework portion has a concave shape depressed toward the left side in the width direction in the plan view, the third framework portion has a concave shape depressed toward the rear side in the longitudinal direction in the plan view, and the fourth framework portion has a concave shape depressed toward the front side in the longitudinal direction in the plan view.

According to a sixth aspect of the present invention, in addition to any of the first to fifth aspects, the subframe further includes a fifth framework portion connecting the third framework portion and the fourth framework portion.

Effect of the Invention

According to the configuration of the first aspect of the present invention, the first hole portion is provided in at least one of the upper member and the lower member in the first region, and the second hole portion is provided in at least one of the upper member and the lower member in the second region. Accordingly, weight saving of the subframe can be realized, while ensuring productivity, strength, and stiffness required for the subframe with a simple configuration.

According to the configuration of the second aspect of the present invention, the first hole portion and the second hole portion are respectively provided in both the upper member and the lower member so as to pass completely therethrough, thereby enabling to realize further weight saving of the subframe.

According to the configuration of the third aspect of the present invention, in the first hole portion and the second hole portion, respective edges thereof are joined to each other, thereby enabling to increase strength of the subframe.

According to the configuration of the fourth aspect of the present invention, the respective edges are joined to each other at the flanges respectively provided in both the upper member and the lower member, thereby enabling to further increase strength of the subframe.

According to the configuration of the fifth aspect of the present invention, the first framework portion has the concave shape depressed toward the right side in the width direction of the vehicle body in the plan view, the second framework portion has the concave shape depressed toward the left side in the width direction of the vehicle body in the plan view, the third framework portion has the concave shape depressed toward the rear side in the longitudinal direction of the vehicle body in the plan view, and the fourth framework portion has the concave shape depressed toward the front side in the longitudinal direction of the vehicle body in the plan view. Accordingly, weight saving of the subframe can be achieved, while ensuring required strength and stiffness of the subframe, and unnecessary interference with right and left wheels, an engine and a transmission, and the vehicle body can be avoided.

According to the configuration of the sixth aspect of the present invention, strength of the subframe can be further increased by providing the fifth framework portion connecting the third framework portion and the fourth framework portion.

EMBODIMENT FOR CARRYING OUT THE INVENTION

Figure 1:
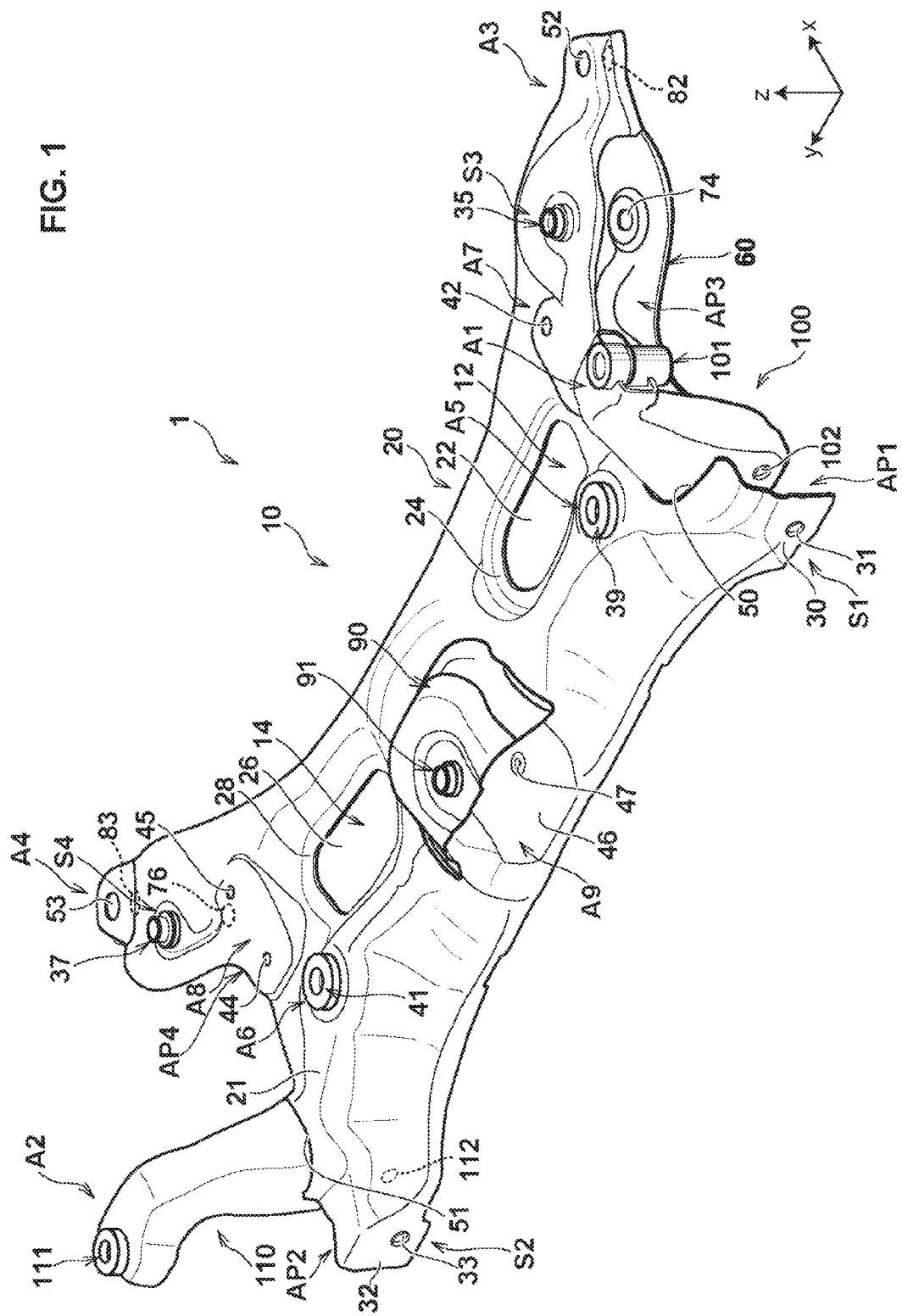
FIG. 1 is a perspective view of a vehicle subframe according to an embodiment of the present invention.

A vehicle subframe according to an embodiment of the present invention is explained in detail below with reference to the accompanying drawings as appropriate. In the drawings, an x-axis, a y-axis, and a z-axis form a three-dimensional orthogonal coordinate system. A positive direction of the x-axis is a rear direction of a vehicle body, a positive direction of the y-axis is a right direction of the vehicle body, and a positive direction of the z-axis is an upper direction of the vehicle body. The x-axis direction may be referred to as "longitudinal direction", and the y-axis direction may be referred to as "width direction".

Figure 2:
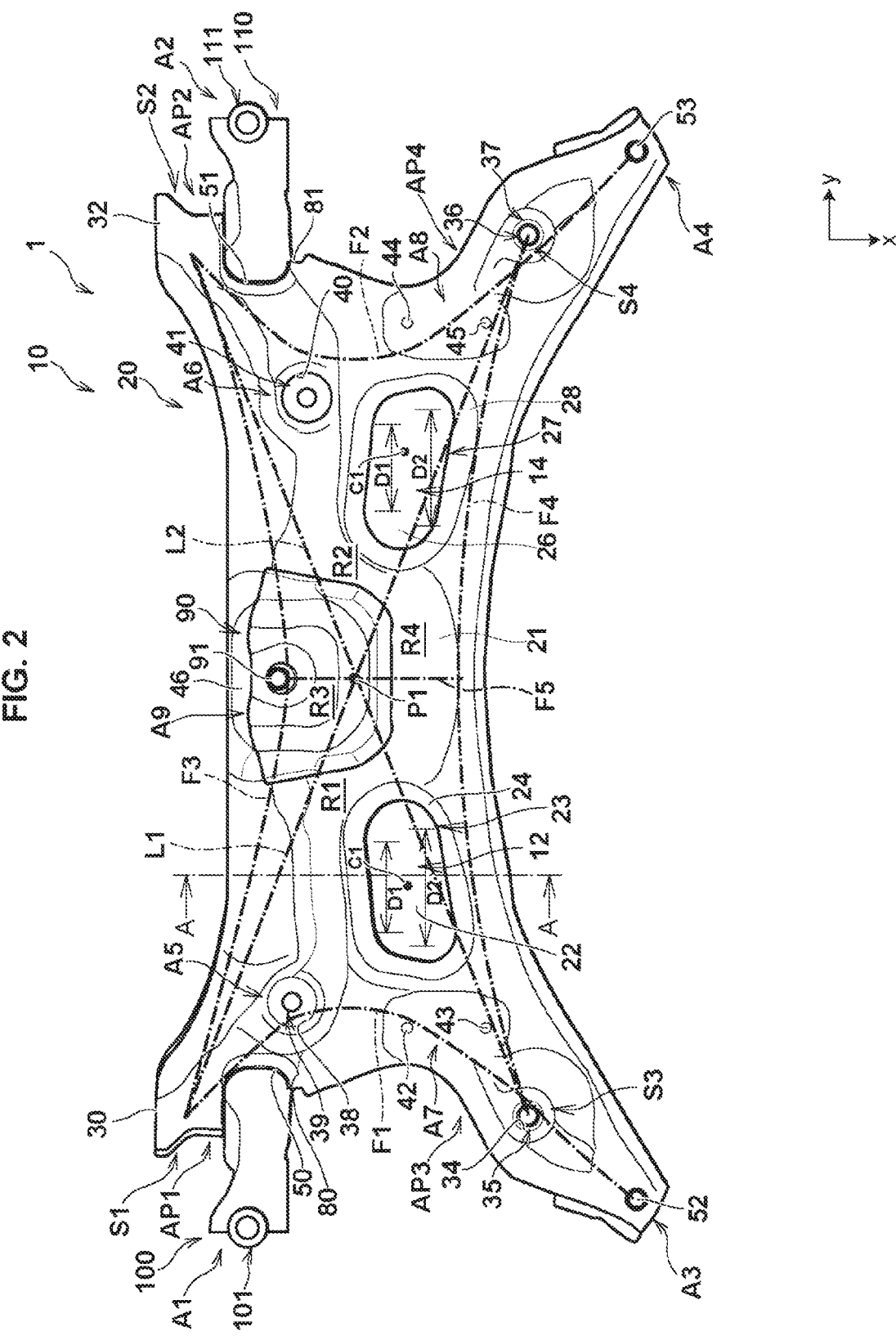
FIG. 2 is a plan view of the subframe according to the embodiment.
Figure 3:
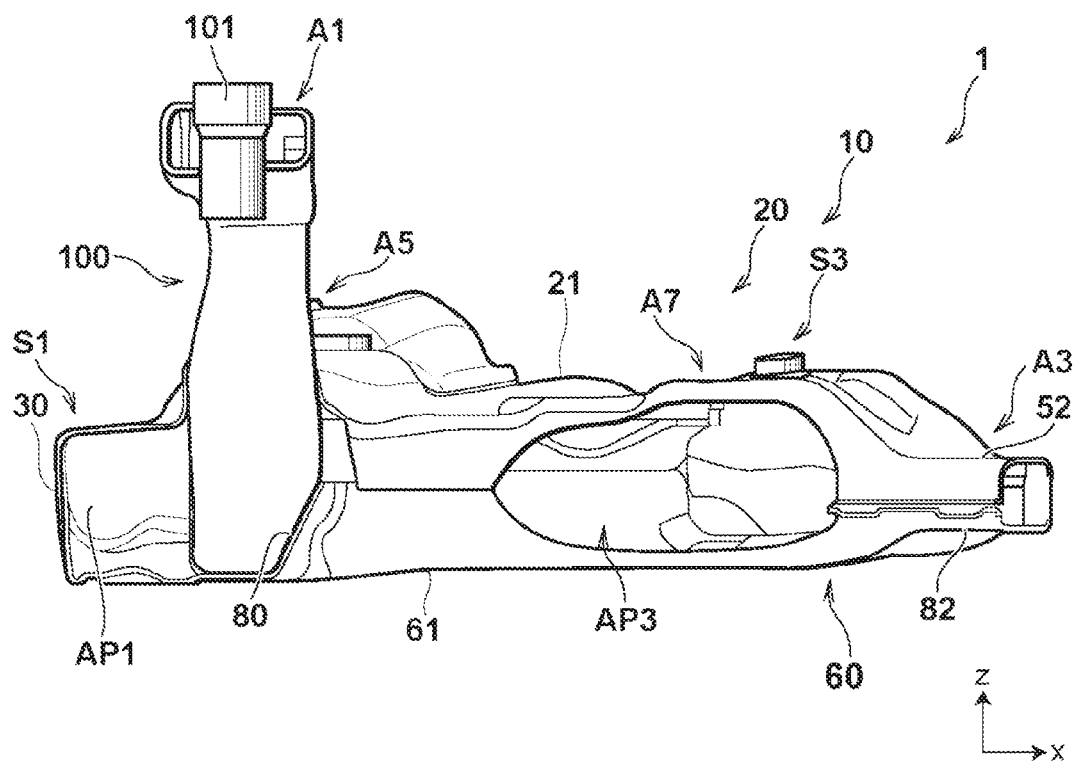
FIG. 3 is a side view of the subframe according to the embodiment.

FIG. 1 is a perspective view of a subframe 1 according to the present embodiment, FIG. 2 is a plan view of the subframe 1 according to the present embodiment, and FIG. 3 is a side view of the subframe 1 according to the present embodiment.

As shown in FIGS. 1 to 3, the subframe 1 is acquired typically by press-molding a plate-like member such as a steel plate, and supports a suspension arm, while being mounted on a vehicle body such as a front side frame (not shown) that defines a front engine bay (not shown) of a vehicle such as an automobile. Typically, the subframe 1 has a bilaterally symmetric shape with respect to a plane parallel to an x-z plane and passing a centerline running in the longitudinal direction at the center of the width direction of the vehicle body.

In the subframe 1, as portions to be mounted on the vehicle body, four portions of a first vehicle-body attachment portion A1, a second vehicle-body attachment portion A2, a third vehicle-body attachment portion A3, and a fourth vehicle-body attachment portion A4 are set. As portions that support the suspension arm, four portions of a first support portion S1, a second support portion S2, a third support portion S3, and a fourth support portion S4 are set.

Furthermore, in the subframe 1, a first framework portion F1 is provided by connecting the first support portion S1 and the third support portion S3, and a second framework portion F2 is provided by connecting the second support portion S2 and the fourth support portion S4. Further, a third framework portion F3 is provided by connecting the first support portion S1 and the second support portion S2, a fourth framework portion F4 is provided by connecting the third support portion S3 and the fourth support portion S4, and a fifth framework portion F5 is provided by connecting the third framework portion F3 and the fourth framework portion F4. Also, attachment portions for mounting various external-force application components can be set in these first framework portion F1 to fifth framework portion F5. As such various attachment portions, a steering-gearbox left attachment portion A5, a steering-gearbox right attachment portion A6, a stabilizer left attachment portion A7, a stabilizer right attachment portion A8, and amount attachment portion A9 can be mentioned.

Furthermore, a straight line L1 connecting the first support portion S1 and the fourth support portion S4 and a straight line L2 connecting the second support portion S2 and the third support portion S3 intersect with each other at an intersection point P1, and define a first region R1, a second region R2, a third region R3, and a fourth region R4 in a plan view. The intersection point P1 is present on a plane parallel to the x-z plane and on a centerline line running in the longitudinal direction at the center of the width direction of the vehicle body.

Specifically, the subframe 1 includes a body portion 10 typically having a box-shaped closed cross-sectional structure. The body portion 10 includes an upper member 20 and a lower member 60 facing the upper member 20, which are welded and integrated with each other by arc welding or the like. The upper member 20 and the lower member 60 are typically acquired by press-molding one plate-like member such as a steel plate. The body portion 10 is formed with a first hole portion 12 and a second hole portion 14, which are described later in detail.

The upper member 20 is basically a plate member having a projecting shape upward, and includes a left-front vertical wall portion 30, which is a vertical wall portion provided so as to suspend downward from a left front end of an upper wall 21 thereof and has an attachment hole 31 formed by punching so as to pass completely through the vertical wall portion in a front-rear direction, and a right-front vertical wall portion 32, which is a vertical wall portion provided so as to suspend downward from a right front end of the upper wall 21 thereof and has an attachment hole 33 formed by punching so as to pass completely through the vertical wall portion in the front-rear direction.

The upper member 20 is also provided with a left-rear through hole 34, which is a through hole formed by punching so as to pass completely through the left rear portion of the upper wall 21 in a vertical direction and has a nut member 35 fixedly provided in the through hole in an upright manner, and a right-rear through hole 36, which is a through hole formed by punching so as to pass completely through the right rear portion of the upper wall 21 in the vertical direction and has a nut member 37 fixedly provided in the through hole in an upright manner.

The upper member 20 is also provided with a left-front through hole 38, which is a through hole formed by punching so as to pass completely through a left front portion of the upper wall 21 in the vertical direction and having a collar member 39 fixedly provided in the through hole in an upright manner, and left attachment holes 42 and 43 formed by punching so as to respectively pass completely through the upper wall 21 in the vertical direction on a rear side of the left-front through hole 38 and provided in parallel with each other at the front and rear, between the left-front vertical wall portion 30 and the left-rear through hole 34.

The upper member 20 is also provided with a right-front through hole 40, which is a through hole formed by punching so as to pass completely through a right front portion of the upper wall 21 in the vertical direction and having a collar member 41 fixedly provided in the through hole in an upright manner, and right attachment holes 44 and 45 formed by punching so as to respectively pass completely through the upper wall 21 in the vertical direction on a rear side of the right-front through hole 40 and provided in parallel with each other at the front and rear, between the right-front vertical wall portion 32 and the right-rear through hole 36.

Furthermore, the upper member 20 is provided with a front-center concave portion 46 between the left-front vertical wall portion 30 and the right-front vertical wall portion 32, which is a concave portion formed by depressing the upper wall 21 downward and has a front-center attachment hole 47 formed by punching so as to pass completely through the upper wall 21 in the vertical direction in the concave portion.

A mounting bracket 90 typically made of a steel plate or the like, which is fixedly provided with a nut member 91 in an upright manner, is welded typically by arc welding or the like and fixedly provided with respect to the front-center concave portion 46.

The upper member 20 is also provided with a left notched portion 50 formed by notching a peripheral edge of the upper wall 21 toward the right side on a rear side of the left-front vertical wall portion 30 and adjacent thereto, and a right notched portion 51 formed by notching the peripheral edge of the upper wall 21 toward the left side on a rear side of the right-front vertical wall portion 32 and adjacent thereto.

The upper member 20 is also provided with a left-rear attachment hole 52 formed by punching so as to pass completely through the upper wall 21 in the vertical direction on a rear side of the left-rear through hole 34, and a right-rear attachment hole 53 formed by punching so as to pass completely through the upper wall 21 in the vertical direction on a rear side of the right-rear through hole 36.

On the other hand, the lower member 60 welded to the upper member 20 so as to face the upper member 20 below thereof includes a left-rear through hole 74, which is a through hole formed by punching so as to pass completely through a bottom wall 61 thereof in the vertical direction and facing the left-rear through hole 34 of the upper member 20 below thereof, and a right-rear through hole 76, which is a through hole formed by punching so as to pass completely through the bottom wall 61 thereof in the vertical direction and facing the right-rear through hole 36 of the upper member 20 below thereof.

The lower member 60 is also provided with a left receiving portion 80, which is a concave portion formed by molding the bottom wall 61 thereof in a receiving shape and facing the left notched portion 50 in the upper member 20 below thereof, and a right receiving portion 81, which is a concave portion formed by molding the bottom wall 61 thereof in a receiving shape and facing the right notched portion 51 in the upper member 20 below thereof.

A left mounting member 100 typically made of a steel material or the like is fixedly provided with respect to the left notched portion 50 and the left receiving portion 80 by being welded thereto typically by arc welding or the like, with a bottom portion thereof being supported by the left receiving portion 80 and a side wall portion thereof being supported by the left notched portion 50. In the left mounting member 100, a collar member 101 is fixedly provided at an upper end thereof by being welded thereto by arc welding or the like, and an attachment hole 102 facing the attachment hole 31 provided in the left-front vertical wall portion 30 of the upper member 20 at the rear thereof is formed in a lower part of the left mounting member 100.

Furthermore, a right mounting member 110 typically made of a steel material or the like is fixedly provided with respect to the right notched portion 51 and the right receiving portion 81 by being welded thereto typically by arc welding or the like, with a bottom portion thereof being supported by the right receiving portion 81 and a side wall portion thereof being supported by the right notched portion 51. In the right mounting member 110, a collar member 111 is fixedly provided at an upper end thereof by being welded thereto by arc welding or the like, and an attachment hole 112 facing the attachment hole 32 provided in the right-front vertical wall portion 32 of the upper member 20 at the rear thereof is formed in a lower part of the right mounting member 110.

The lower member 60 is further provided with a left-rear attachment hole 82, which is a through hole formed by punching so as to pass completely through the bottom wall 61 thereof in the vertical direction and facing the left-rear attachment hole 52 in the upper member 20 below thereof, and a right-rear attachment hole 83, which is a through hole formed by punching so as to pass completely through the bottom wall 61 thereof in the vertical direction and facing the right-rear attachment hole 53 in the upper member 20 below thereof.

In the above configuration, the body portion 10 is provided with a first aperture portion AP1, a second aperture portion AP2, a third aperture portion AP3, and a fourth aperture portion AP4, respectively being a portion in which the inside thereof is open to the outside. Specifically, the first aperture portion AP1 is a portion in which the inside of the body portion 10 is open to the outside between the left-front vertical wall portion 30 of the upper member 20 and the left mounting member 100. The second aperture portion AP2 is a portion in which the inside of the body portion 10 is open to the outside between the right-front vertical wall portion 32 of the upper member 20 and the right mounting member 110. The third aperture portion AP3 is a portion in which the inside of the body portion 10 is open to the outside between the left mounting member 100 and the left-rear through hole 34 of the upper member 20 and the left-rear through hole 74 of the lower member 60. The fourth aperture portion AP4 is a portion in which the inside of the body portion 10 is open to the outside between the right mounting member 110 and the right-rear through hole 36 of the upper member 20 and the right-rear through hole 76 of the lower member 60.

The first framework portion F1, the second framework portion F2, the third framework portion F3, the fourth framework portion F4, and the fifth framework portion F5 are not provided as an independent framework member. These portions are high-strength portions having relatively large vertical section due to the upper wall 21 of the upper member 20 and the bottom wall 61 of the lower member 60 vertically away from each other. With respect to these high-strength portions, the steering-gearbox left attachment portion A5, the steering-gearbox right attachment portion A6, the stabilizer left attachment portion A7, the stabilizer right attachment portion A8, and the mount attachment portion A9 are set respectively correspondingly, in addition to the first support portion S1, the second support portion S2, the third support portion S3, and the fourth support portion S4.

More specifically, the first support portion S1 is provided at left-front ends of the first framework portion F1 and the third framework portion F3, corresponding to the first aperture portion AP1 defined between the left-front vertical wall portion 30 of the upper member 20 and the left mounting member 100. In the first support portion S1, a left-front pivot of a suspension arm is fastened by a fastening member such as a fastening bolt (respectively not shown) and mounted thereon via the attachment hole 31 provided in the left-front vertical wall portion 30 and the attachment hole 102 provided in the left mounting member 100. The left-front pivot is a suspension pivot located so as to face the right side of a left-front wheel-side suspension pivot (not shown), which defines the position of the left front wheel in the width direction, and applies a relatively large external force mainly in the width direction with respect to the body portion 10. As a typical configuration of the left-front pivot, there can be mentioned an insulator bush member having a configuration in which a rubber portion is bonded to a collar member, into which a fastening member thereof is inserted, and having a small spring constant in the longitudinal direction and a large spring constant in the width direction.

The second support portion S2 is provided at right-front ends of the second framework portion F2 and the third framework portion F3, corresponding to the second aperture portion AP2 defined between the right-front vertical wall portion 32 of the upper member 20 and the right mounting member 110. In the second support portion S2, a right-front pivot of a suspension arm is fastened by a fastening member such as a fastening bolt (respectively not shown) and mounted thereon via the attachment hole 33 provided in the right-front vertical wall portion 32 and the attachment hole 112 provided in the right mounting member 110. The right-front pivot is a suspension pivot located so as to face the left side of a right-front wheel-side suspension pivot (not shown), which defines the position of the right front wheel in the width direction, and applies a relatively large external force mainly in the width direction with respect to the body portion 10. As a typical configuration of the right-front pivot, there can be mentioned the insulator bush member having the configuration in which the rubber portion is bonded to the collar member, into which a fastening member thereof is inserted, and having a small spring constant in the longitudinal direction and a large spring constant in the width direction.

The third support portion S3 is provided at left-rear ends of the first framework portion F1 and the fourth framework portion F4, corresponding to the left-rear through hole 34 fixedly provided with the nut member 35 of the upper member 20 and the left-rear through hole 74 of the lower member 60. In the third support portion S3, a left-rear suspension pivot of a left suspension arm is fastened by a fastening member such as a fastening bolt (respectively not shown) and mounted thereon, via the nut member 35 and the left-rear through hole 74.

The fourth support portion S4 is provided at right-rear ends of the second framework portion F2 and the fourth framework portion F4, corresponding to the right-rear through hole 36 fixedly provided with the nut member 37 of the upper member 20 and the right-rear through hole 76 of the lower member 60. In the fourth support portion S4, a right-rear suspension pivot of a right suspension arm is fastened by a fastening member such as a fastening bolt (respectively not shown) and mounted thereon, via the nut member 37 and the right-rear through hole 74.

The right and left suspension arms are typically a front-suspension L-type lower arm. In this case, the left-rear suspension pivot and the right-rear suspension pivot are compliance bush members typically having a configuration in which a rubber portion is bonded to a collar member, into which a corresponding fastening member thereof is inserted, and having a small spring constant in the longitudinal direction and the vertical direction and a large spring constant in the width direction. Further, the third aperture portion AP3 defines a clearance gap in which a portion continuous to the left-rear pivot of the left suspension arm bound by a predetermined geometry does not interfere with the upper member 20 and the lower member 60. The fourth aperture portion AP4 also defines a clearance gap in which a portion continuous to the right-rear pivot of the right suspension arm bound by a predetermined geometry does not interfere with the upper member 20 and the lower member 60.

The steering-gearbox left attachment portion A5 is provided corresponding to the left-front through hole 38, to which the collar member 39 of the upper member 20 is fixedly provided, at a left joined part between the first framework portion F1 and the third framework portion F3. The steering-gearbox right attachment portion A6 is provided corresponding to the right-front through hole 40, to which the collar member 41 of the upper member 20 is fixedly provided, at a right joined part between the second framework portion F2 and the third framework portion F3. In the steering-gearbox left attachment portion A5 and the steering-gearbox right attachment portion A6, a steering gearbox is fastened by a fastening member such as a fastening bolt (respectively not shown) and mounted thereon respectively via the collar members 39 and 41.

The stabilizer left attachment portion A7 is provided corresponding to the left attachment holes 42 and 43 of the upper member 20 in the first framework portion F1. The stabilizer right attachment portion A8 is provided corresponding to the right attachment holes 44 and 45 of the upper member 20 in the second framework portion F2. In the stabilizer left attachment portion A7 and the stabilizer right attachment portion A8, each of bar-like stabilizers is fastened by a fastening member such as a fastening bolt (respectively not shown) and mounted thereon together with an attachment bracket, respectively via the left attachment holes 42 and 43, and the right attachment holes 44 and 45.

The mount attachment portion A9 is provided corresponding to the front-center concave portion 46 having the front-center attachment hole 47 of the upper member 20 and the mounting bracket 90 fixedly provided with the nut member 91, in a front joined part between the third framework portion F3 and the fifth framework portion F5. In the mount attachment portion A9, each of mounting members of an engine transmission system is typically fastened by a fastening member such as a fastening bolt (respectively not shown) and mounted thereon, via the front-center attachment hole 47 and the nut member 91. The mounting member typically has a configuration in which a rubber portion is bonded to a collar member, into which the fastening member thereof is inserted, to suppress movement of the engine transmission system in which a spring constant in the vertical direction is set smaller and spring constants in the longitudinal direction and the width direction are set larger. The mounting member is coupled to a case of the engine transmission system typically via a member made of a steel material or the like.

The first vehicle-body attachment portion A1, the second vehicle-body attachment portion A2, the third vehicle-body attachment portion A3, and the fourth vehicle-body attachment portion A4 are also set respectively corresponding to the first framework portion F1, the second framework portion F2, the third framework portion F3, and the fourth framework portion F4.

Specifically, the first vehicle-body attachment portion A1 is provided corresponding to the collar member 101 of the left mounting member 100. The left mounting member 100 is fixedly provided with respect to the left receiving portion 80 and the left notched portion 50, with the bottom portion thereof being supported by the left receiving portion 80 and the side wall portion thereof being supported by the left notched portion 50. Therefore, the first vehicle-body attachment portion A1 is provided with respect to the first framework portion F1. In the first vehicle-body attachment portion A1, the collar member 101 of the left mounting member 100 is fastened to a left-front side frame by a fastening member such a fastening bolt (respectively not shown) and mounted on the vehicle body side.

The second vehicle-body attachment portion A2 is provided corresponding to the collar member 111 of the right mounting member 110. The right mounting member 110 is fixedly provided with respect to the right receiving portion 81 and the right notched portion 51, with the bottom portion thereof being supported by the right receiving portion 81 and the side wall portion thereof being supported by the right notched portion 51. Therefore, the second vehicle-body attachment portion A2 is provided with respect to the second framework portion F2. In the second vehicle-body attachment portion A2, the collar member 111 of the right mounting member 110 is fastened to a right-front side frame by a fastening member such a fastening bolt (respectively not shown) and mounted on the vehicle body side.

The third vehicle-body attachment portion A3 is provided diagonally left rearward of the first support portion S1, corresponding to the left-rear attachment hole 52 of the upper member 20 and the left-rear attachment hole 82 of the lower member 60, and in an extended portion of the left-rear ends of the first framework portion F1 and the fourth framework portion F4. In the third vehicle-body attachment portion A3, the upper member 20 and the lower member 60 are fastened to the left-front side frame by a fastening member such a fastening bolt (respectively not shown) and mounted on the vehicle body side, via these left-rear attachment holes 52 and 82. A collar member can be fitted between the left-rear attachment holes 52 and 82.

The fourth vehicle-body attachment portion A4 is provided diagonally right rearward of the second support portion S2, corresponding to the right-rear attachment hole 53 of the upper member 20 and the right-rear attachment hole 83 of the lower member 60, and in an extended portion of the right-rear ends of the second framework portion F2 and the fourth framework portion F4. In the fourth vehicle-body attachment portion A4, the upper member 20 and the lower member 60 are fastened to the right-front side frame by a fastening member such a fastening bolt (respectively not shown) and mounted on the vehicle body side, via these right-rear attachment holes 53 and 83. A collar member can be fitted between the right-rear attachment holes 53 and 83.

In the above configuration, the body portion 10 typically has a dimensional relation such that the length thereof in the front-rear direction is shorter than the width thereof in the horizontal direction. Specifically, the distance between the first vehicle-body attachment portion A1 and the third vehicle-body attachment portion A3 is equal to the distance between the second vehicle-body attachment portion A2 and the fourth vehicle-body attachment portion A4. The distance between the first vehicle-body attachment portion A1 and the third vehicle-body attachment portion A3 and the distance between the second vehicle-body attachment portion A2 and the fourth vehicle-body attachment portion A4 are shorter than the distance between the first vehicle-body attachment portion A1 and the second vehicle-body attachment portion A2 and the distance between the third vehicle-body attachment portion A3 and the fourth vehicle-body attachment portion A4. Further, the distance between the first support portion S1 and the third support portion S3 is equal to the distance between the second support portion S2 and the fourth support portion S4. The distance between the first support portion S1 and the third support portion S3 and the distance between the second support portion S2 and the fourth support portion S4 are shorter than the distance between the first support portion S1 and the second support portion S2 and the distance between the third support portion S3 and the fourth support portion S4.

In a plan view, it is preferable that the first framework portion F1 connects the first support portion S1 and the third support portion S3 and supports the first vehicle-body attachment portion A1, the steering-gearbox left attachment portion A5, and the stabilizer left attachment portion A7 therebetween. It is also preferable that the first framework portion F1 supports the third vehicle-body attachment portion A3 diagonally left rearward of the third support portion S3, and extends in a concave shape depressed toward the right side in order to avoid an envelope shape of a left wheel. It is preferable that the second framework portion F2 connects the second support portion S2 and the fourth support portion S4 and supports the second vehicle-body attachment portion A2, the steering-gearbox right attachment portion A6, and the stabilizer right attachment portion A8 therebetween. It is also preferable that the second framework portion F2 supports the fourth vehicle-body attachment portion A4 diagonally right rearward of the fourth support portion S4, and extends in a concave shape depressed toward the left side in order to avoid an envelope shape of a right wheel. It is preferable that the third framework portion F3 connects the first support portion S1 and the second support portion S2 and supports the steering-gearbox left attachment portion A5, the mount attachment portion A9, and the steering-gearbox right attachment portion A6 therebetween, to extend in a concave shape depressed rearwards in order to avoid the engine transmission system. Further, it is preferable that the fourth framework portion F4 connects the third support portion S3 and the fourth support portion S4, and supports the third vehicle-body attachment portion A3 diagonally left rearward of the third support portion S3 and the fourth vehicle-body attachment portion A4 diagonally right rearward of the fourth support portion S4, to extend in a concave shape depressed forwards in order to avoid a dashboard lower panel of the vehicle body.

Figure 4:
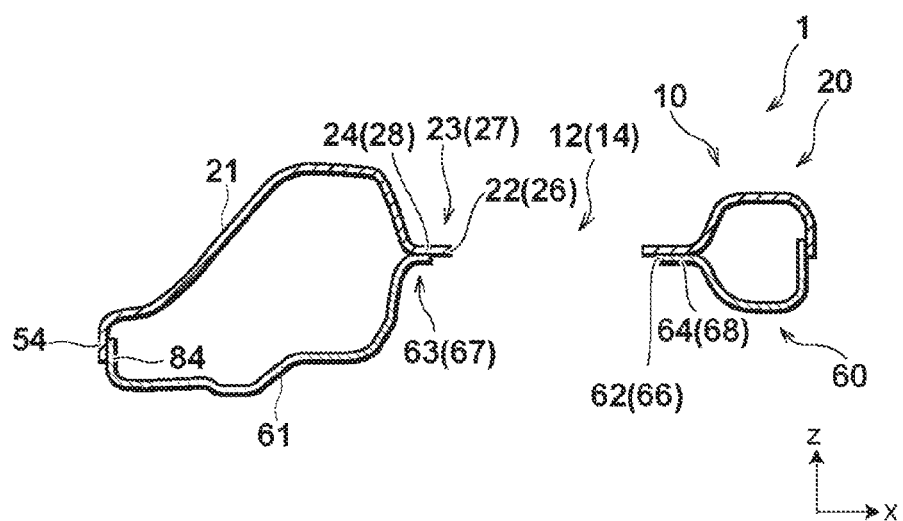
FIG. 4 shows an A-A cross section in FIG. 2.

Configurations of the first hole portion 12 and the second hole portion 14 provided in the body portion 10 are described in detail, with reference to FIG. 4 in addition to FIGS. 1 to 3. The first hole portion 12 and the second hole portion 14 typically have a shape bilaterally symmetrical with respect to a plane parallel to the x-z plane and passing a centerline running in the longitudinal direction at the center of the width direction of the vehicle body.

FIG. 4 shows an A-A cross section in FIG. 2. Incidentally, although FIG. 4 mainly shows the first hole portion 12, for convenience sake, the second hole portion 14 is also shown with reference numerals in a parenthes.

As shown in FIG. 4, the first hole portion 12 is constituted by a first upper hole portion 22 being a through hole formed by punching so as to pass completely through the upper wall 21 of the upper member 20 in the vertical direction, and a first lower hole portion 62 being a through hole formed by punching so as to pass completely through the bottom wall 61 of the lower member 60 in the vertical direction, and to be adjacent to the first upper hole portion 22 below thereof.

If a first region R1 spreadly extending toward the left side from the intersection point P1 of the straight line L1 connecting the first support portion S1 and the fourth support portion S4 and the straight line L2 connecting the second support portion S2 and the third support portion S3, a second region R2 spreadly extending toward the right side from the intersection point P1, a third region R3 spreadly extending toward the front side from the intersection point P1, and a fourth region R4 spreadly extending toward the rear side from the intersection point P1 are defined in the body portion 10 in a plan view by the straight line L1 and the straight line L2, the first hole portion 12 is provided in the first region R1.

The reason the first hole portion 12 is provided in the first region R1 is that it is taken into account that the first hole portion 12 can be formed as a single hole portion so that press molding thereof is simplified, and can be acquired as a hole portion having a relatively large size to achieve weight saving of the body portion 10, while sufficiently ensuring required strength and stiffness of the body portion 10. For example, if it is assumed that the first hole portion 12 is provided in the third region R3 or the fourth region R4, because the fifth framework portion F5 needs to be present in these regions, the first hole portion 12 needs to have a form of a divided hole portion so as not to divide the fifth framework portion F5. Particularly, the third framework portion F3 in the third region R3 is a main framework portion in the body portion 10 that supports the right and left front pivots of the suspension arm and receives a relatively large external force in the vehicle width direction. Therefore, arrangement of the first hole portion 12 in the third region R3 may decrease strength and stiffness unnecessarily.

If the first hole portion 12 is provided in the first region R1, the framework portions can be left along the straight line L1 connecting the first support portion S1 and the fourth support portion S4 and the straight line L2 connecting the second support portion S2 and the third support portion S3, and thus torsional strength and stiffness of the subframe 1 can be maintained high.

However, in order to increase the size of the first hole portion 12, the first hole portion 12 can be provided so that a part thereof enters into the fourth region R4. In this case, from a viewpoint of sufficiently ensuring required strength and stiffness of the body portion 10, it is preferable that the area of the first hole portion 12 in a plan view located in the first region R1 is larger than the area thereof in a plan view located in the fourth region R4, and that a centroid C1 of the first hole portion 12 in a plan view is located in the first region R1.

Furthermore, a first upper edge 23 being a peripheral edge continuous to a wall portion where the upper wall 21 is depressed downward in the first upper hole portion 22, and a first lower edge 63 being a peripheral edge continuous to a wall portion where the bottom wall 61 is depressed upward in the first lower hole portion 62 are preferably welded by arc welding or the like to be joined to each other, in order to reduce stress concentration in the peripheral edge of the first hole portion 12.

In order to further reduce the stress concentration, it is preferable that the first upper edge 23 has a first upper flange 24 being a horizontal plate-like portion continuous to the wall portion where the upper wall 21 is depressed downward, and the first lower edge 63 has a first lower flange 64 being a horizontal plate-like portion continuous to the wall portion where the bottom wall 61 is depressed upward. In this case, it is preferable that the first upper flange 24 and the first lower flange 64 are welded by arc welding or the like to be joined to each other. Further, in this case, it is preferable that an end of the first upper flange 24 protrudes toward the side of the first hole portion 12 more than an end of the first lower flange 64, so that moisture does not unnecessarily reach a joined part of the first upper flange 24 and the first lower flange 64.

In the first hole portion 12, in order to further reduce the stress concentration in the peripheral edge by balancing the stress between a front peripheral edge and a rear peripheral edge, it is preferable to set a length D2 of a rear peripheral edge of the first hole portion 12 in the vehicle width direction to be larger than a length D1 of a front peripheral edge of the first hole portion 12 in the vehicle width direction, to form the first hole portion 12 substantially in a trapezoidal shape in a plan view. This is because it is taken into account that a relatively large external force is applied in the vehicle width direction from the left-front pivot and the right-front pivot in the suspension arm to the third framework portion F3 extending on the front side of the first hole portion 12, and the steering-gearbox left attachment portion A5, the steering-gearbox right attachment portion A6, and the mount attachment portion A9 are set in the third framework portion F3. The shape of the first hole portion 12 in a plan view can be a substantially rectangular shape, a substantially elliptical shape, or a substantially semi-circular shape, so long as the centroid C1 thereof is located in the first region R1.

As shown in FIG. 4, in a general joined part of the upper member 20 and the lower member 60, an upper joining part 54 being a lower end portion of a vertical wall suspending downward from the upper wall 21 of the upper member 20 and a lower joining part 84 being an upper end portion of a vertical wall provided in an upright manner from the bottom wall 61 of the lower member 60 are welded by arc welding or the like to be joined to each other. In this configuration, it is preferable that the upper joining part 54 is overlapped on the lower joining part 84 from outside so that moisture does not unnecessarily reach the joined part of the upper joining part 54 and the lower joining part 84, and the lower joining part 84 is not exposed to the outside.

The configuration of the second hole portion 14 is identical to that of the first hole portion 12, except that the second hole portion 14 is provided in the second region R2 and has a shape horizontally reversed thereto. The first upper hole portion 22, the first upper edge 23, the first upper flange 24, the first lower hole portion 62, the first lower edge 63, and the first lower flange 64 in the first hole portion 12 respectively correspond to a second upper hole portion 26, a second upper edge 27, a second upper flange 28, a second lower hole portion 66, a second lower edge 67, and a second lower flange 68 in the second hole portion 14.

With regard to the first hole portion 12 and the second hole portion 14 provided in the body portion 10 having the above configuration, various modifications can be considered. Therefore, configurations of such modifications are also described in detail with reference to FIG. 5 and FIG. 6. In these modifications, the difference is that a part of the configuration regarding the first hole portion 12 and the second hole portion 14 in the above configuration is different. Therefore, the difference is mainly described, and same constituent elements are denoted by like reference characters, and descriptions thereof are omitted or simplified.

Figure 5:
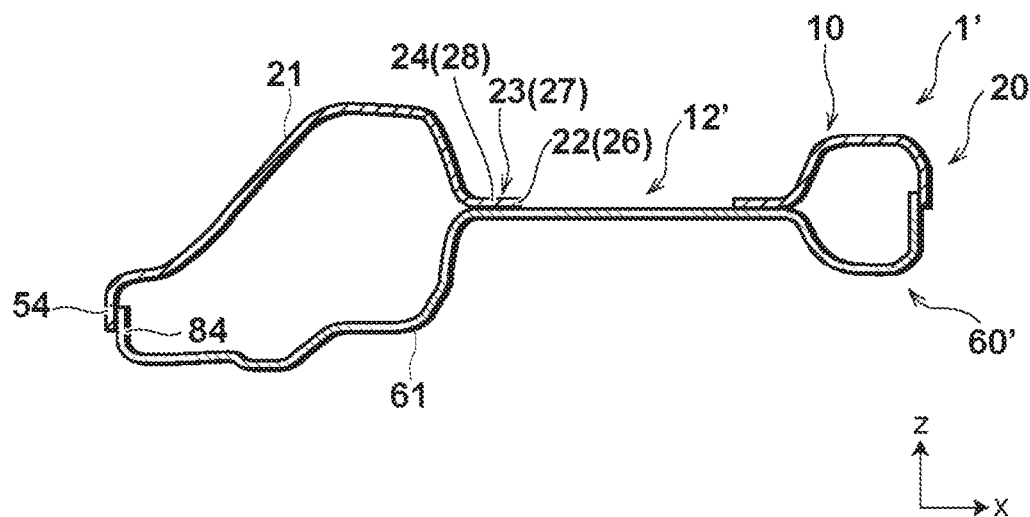
FIG. 5 is a sectional view corresponding to the A-A cross section in FIG. 2 of a subframe according to a modification of the embodiment.

FIG. 5 is a sectional view corresponding to the A-A cross section in FIG. 2 of a subframe according to a modification of the present embodiment.

In a subframe 1' according to the present modification, while the first upper hole portion 22 is provided in the upper member 20 in a first hole portion 12', no first lower hole portion is provided in a lower member 60'. Further, the configuration of a second hole portion 14' is identical to that of the first hole portion 12', except that the second hole portion 14' is provided in the second region R2 and has a shape horizontally reversed thereto.

With such a configuration, weight saving can be achieved for the subframe 1', because the first upper hole portion 22 and the second upper hole portion 26 are provided in the upper member 20.

Figure 6:
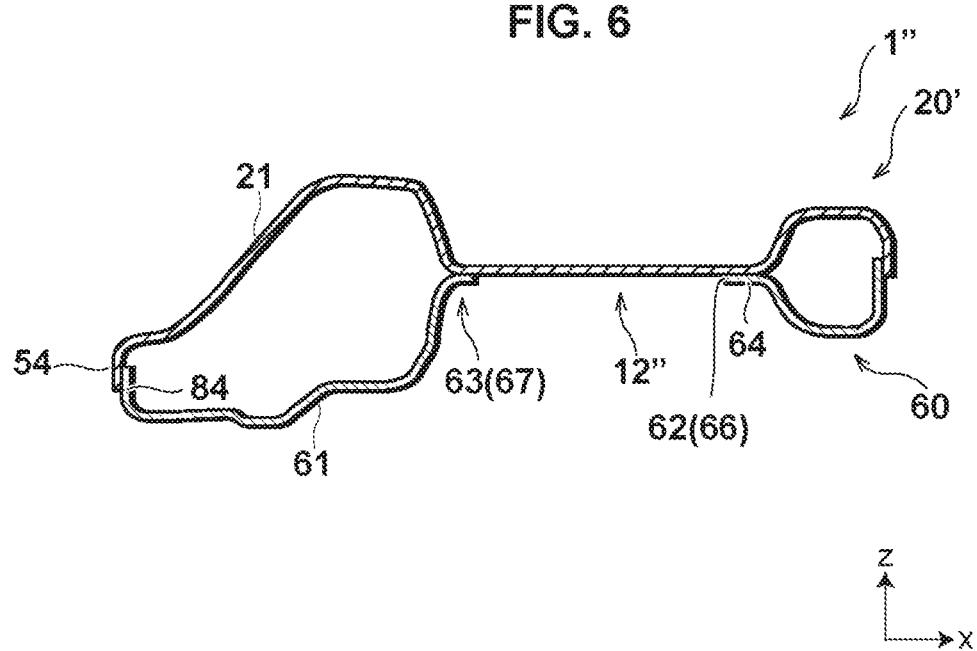
FIG. 6 is a sectional view corresponding to the A-A cross section in FIG. 2 of a subframe according to another modification of the embodiment.

FIG. 6 is a sectional view corresponding to the A-A cross section in FIG. 2 of a subframe according to another modification of the present embodiment.

In a subframe 1" according to the present modification, while the first lower hole portion 62 is provided in the lower member 60 in a first hole portion 12", no first upper hole is provided in an upper member 20'. Further, the configuration of a second hole portion 14" is identical to that of the first hole portion 12", except that the second hole portion 14" is provided in the second region R2 and has a shape horizontally reversed thereto.

With such a configuration, weight saving can be achieved for the subframe 1", because the first lower hole portion 62 and the second lower hole portion 66 are provided in the lower member 60. Further, peripheral edges thereof can be covered with the upper member 20. Therefore, unnecessary entry of moisture into the subframe 1" from the peripheral edges can be prevented.

Various nut members and collar members described above are typically made of metal such as a steel material.

In the present embodiment including the various modifications described above, the suspension arm can be other than the L-type, so long as it has the same function.

In the present embodiment including the various modifications described above, the subframes 1, 1', and 1" can be mounted on the vehicle body, not in a so-called rigid form but in a floating form.

In the present embodiment including the various modifications described above, the various first hole portions 12, 12', and 12" and the various second hole portions 14, 14', and 14" can be appropriately combined.

In the present embodiment including the various modifications described above, the first hole portion 12, 12', or 12" is provided in at least one of the upper member 20 and the lower member 60 in the first region R1, and the second hole portion 14, 14', or 14" is provided in at least one of the upper member 20 and the lower member 60 in the second region R2. Accordingly, weight saving of the subframes 1, 1', and 1" can be realized, while ensuring required strength and stiffness of the subframes 1, 1', and 1", with a simple configuration.

Further, because the first hole portions 12, 12', and 12" and the second hole portions 14, 14', and 14" respectively have the through holes 22, 26, 62, and 66 provided in both the upper member 20 and the lower member 60 to pass completely therethrough, further weight saving of the subframes 1, 1', and 1" can be realized.

The first hole portions 12, 12', and 12" and the second hole portions 14, 14', and 14" are also joined to each other at the edges 23, 27, 63, and 67 thereof, thereby enabling to increase the strength of the subframes 1, 1', and 1".

Furthermore, the edges 23, 27, 63, and 67 are joined to each other at the flanges 24, 28, 64, and 68 provided in both the upper member 20 and the lower member 60, thereby enabling to further increase the strength of the subframes 1, 1', and 1".

The first framework portion F1 has a concave shape depressed toward the right side in the width direction of the vehicle body in a plan view, the second framework portion F2 has a concave shape depressed toward the left side in the width direction of the vehicle body in a plan view, the third framework portion F3 has a concave shape depressed toward the rear side in the longitudinal direction of the vehicle body in a plan view, and the fourth framework portion F4 has a concave shape depressed toward the front side in the longitudinal direction of the vehicle body in a plan view. Accordingly, weight saving of the subframes 1, 1', and 1" can be achieved, while ensuring required strength and stiffness thereof, and unnecessary interference with the right and left wheels, the engine and the transmission, and the vehicle body can be avoided.

Further, because the fifth framework portion F5 connecting the third framework portion F3 and the fourth framework portion F4 is provided, strength of the subframes 1, 1', and 1" can be further increased.

In the present invention, the type, the form, the arrangement, the number, and the like of the constituent members are not limited to those in the embodiment explained above, and it is needless to mention that the constituent elements can be modified as appropriate without departing from the scope of the invention, such as appropriately replacing these elements by other ones having identical operational effects.

INDUSTRIAL APPLICABILITY

As described above, the present invention can provide a vehicle subframe that can achieve weight saving, while ensuring required productivity, strength, and the like with a simple configuration. Therefore, because of its general purposes and universal characteristics, applications of the present invention can be expected in a wide range in the field of a subframe of a vehicle body of a movable body such as a vehicle.

The invention claimed is:

1. A vehicle subframe mounted on a vehicle body, comprising:
 a body portion having an upper member and a lower member joined to the upper member below thereof, in which the upper member and the lower member are cooperatively to constitute a closed cross section;
 a plurality of support portions provided with respect to the body portion to support a plurality of suspension arms correspondingly;
 a first support portion, of the support portions, provided on a left side in a width direction and on a front side in a longitudinal direction of the vehicle body;
 a second support portion, of the support portions, provided on a right side in the width direction and on the front side in the longitudinal direction;
 a third support portion, of the support portions, provided on the left side in the width direction and on a rear side in the longitudinal direction; and
 a fourth support portion, of the support portions, provided on the right side in the width direction and on the rear side in the longitudinal direction, wherein
 a plurality of regions are defined in the body portion in a plan view, by a straight line connecting the first support portion and the fourth support portion and a straight line connecting the second support portion and the third support portion,
 the regions include a first region spreadly extending from an intersection point between the straight lines toward the left side in the width direction, a second region spreadly extending from the intersection point toward the right side in the width direction, a third region spreadly extending from the intersection point toward the front side in the longitudinal direction, and a fourth region spreadly extending from the intersection point toward the rear side in the longitudinal direction,
 a first hole portion is provided to straddle over the first region and the fourth region in at least one of the upper member and the lower member, and a second hole portion is provided to straddle over the second region and the fourth region in at least one of the upper member and the lower member, and
 the first hole portion and the second hole portion are disposed such that the area of the first hole portion in the plan view located in the first region is larger than an area thereof in the plan view located in the fourth region, and the area of the second hole portion in the plan view located in the second region is larger than an area thereof in the plan view located in the fourth region.

2. The vehicle subframe according to claim 1, wherein the first hole portion and the second hole portion respectively include through holes provided in both the upper member and the lower member so as to pass completely therethrough.

3. The vehicle subframe according to claim 2, wherein, in the first hole portion and the second hole portion, respective edges thereof are joined to each other.

4. The vehicle subframe according to claim 3, wherein the respective edges are joined to each other at flanges respectively provided in both the upper member and the lower member.

5. The vehicle subframe according to claim 1, wherein the body portion includes a first framework portion extending between the first support portion and the third support portion, a second framework portion extending between the second support portion and the fourth support portion, a third framework portion extending between the first support portion and the second support portion, and a fourth framework portion extending between the third support portion and the fourth support portion, and the first framework portion has a concave shape depressed toward the right side in the width direction in the plan view, the second framework portion has a concave shape depressed toward the left side in the width direction in the plan view, the third framework portion has a concave shape depressed toward the rear side in the longitudinal direction in the plan view, and the fourth framework portion has a concave shape depressed toward the front side in the longitudinal direction in the plan view.

6. The vehicle subframe according to claim 5, further comprising a fifth framework portion connecting the third framework portion and the fourth framework portion.

7. The vehicle subframe according to claim 2, wherein the body portion includes a first framework portion extending between the first support portion and the third support portion, a second framework portion extending between the second support portion and the fourth support portion, a third framework portion extending between the first support portion and the second support portion, and a fourth framework portion extending between the third support portion and the fourth support portion, and the first framework portion has a concave shape depressed toward the right side in the width direction in the plan view, the second framework portion has a concave shape depressed toward the left side in the width direction in the plan view, the third framework portion has a concave shape depressed toward the rear side in the longitudinal direction in the plan view, and the fourth framework portion has a concave shape depressed toward the front side in the longitudinal direction in the plan view.

8. The vehicle subframe according to claim 3, wherein the body portion includes a first framework portion extending between the first support portion and the third support portion, a second framework portion extending between the second support portion and the fourth support portion, a third framework portion extending between the first support portion and the second support portion, and a fourth framework portion extending between the third support portion and the fourth support portion, and the first framework portion has a concave shape depressed toward the right side in the width direction in the plan view, the second framework portion has a concave shape depressed toward the left side in the width direction in the plan view, the third framework portion has a concave shape depressed toward the rear side in the longitudinal direction in the plan view, and the fourth framework portion has a concave shape depressed toward the front side in the longitudinal direction in the plan view.

9. The vehicle subframe according to claim 4, wherein the body portion includes a first framework portion extending between the first support portion and the third support portion, a second framework portion extending between the second support portion and the fourth support portion, a third framework portion extending between the first support portion and the second support portion, and a fourth framework portion extending between the third support portion and the fourth support portion, and the first framework portion has a concave shape depressed toward the right side in the width direction in the plan view, the second framework portion has a concave shape depressed toward the left side in the width direction in the plan view, the third framework portion has a concave shape depressed toward the rear side in the longitudinal direction in the plan view, and the fourth framework portion has a concave shape depressed toward the front side in the longitudinal direction in the plan view.

* * * * *